(12) United States Patent
Pelton

(10) Patent No.: US 7,749,120 B2
(45) Date of Patent: Jul. 6, 2010

(54) POWER TRANSMISSION BELT

(75) Inventor: Daniel A. Pelton, Moore County, NC (US)

(73) Assignee: Dayco Products, LLC, Tulsa, OK (US)

( * ) Notice: Subject to any disclaimer, the term of this patent is extended or adjusted under 35 U.S.C. 154(b) by 606 days.

(21) Appl. No.: 11/592,972

(22) Filed: Nov. 3, 2006

(65) Prior Publication Data
US 2008/0108466 A1 May 8, 2008

(51) Int. Cl.
F16G 5/20 (2006.01)
F16G 1/00 (2006.01)
F16G 5/00 (2006.01)
F16G 1/02 (2006.01)
F16G 1/28 (2006.01)

(52) U.S. Cl. .......... 474/267; 474/250; 474/260; 474/265; 474/271

(58) Field of Classification Search .......... 474/250, 474/260, 263, 265, 267, 271
See application file for complete search history.

(56) References Cited

U.S. PATENT DOCUMENTS

| | | | |
|---|---|---|---|
| 1,828,136 A | 10/1931 | Freedlender | |
| 3,006,175 A * | 10/1961 | Morgan | 66/177 |
| 3,078,206 A | 2/1963 | Skura | |
| 3,083,710 A * | 4/1963 | Rauser | 602/67 |
| 3,853,017 A | 12/1974 | White, Jr. et al. | |
| 4,015,038 A | 3/1977 | Romanski et al. | |
| 4,305,714 A | 12/1981 | Renshaw | |
| 4,332,576 A | 6/1982 | Stecklein et al. | |
| 4,518,375 A | 5/1985 | Mashimo et al. | |
| 5,171,190 A | 12/1992 | Fujiwara et al. | |
| 5,362,281 A | 11/1994 | Dutton et al. | |
| 5,427,728 A | 6/1995 | Beck et al. | |
| 5,529,545 A | 6/1996 | Isshiki et al. | |
| 5,645,504 A * | 7/1997 | Westhoff | 474/250 |
| 6,159,121 A | 12/2000 | DiGiacomo et al. | |
| 6,632,151 B1 | 10/2003 | Knutson | |
| 2004/0152551 A1* | 8/2004 | Okuno et al. | 474/263 |

\* cited by examiner

Primary Examiner—Robert A Siconolfi
Assistant Examiner—Henry Liu
(74) Attorney, Agent, or Firm—Thompson Hine LLP

(57) ABSTRACT

A power transmission belt. The power transmission belt includes the following: a backing layer; a body having a top surface and a bottom surface, the bottom surface joined with the backing layer, the top surface including a plurality of teeth, and the body including a plurality of reinforcing cords positioned between the top and bottom surfaces; and a fabric material having a top surface and a bottom surface, the bottom surface at least partially embedded in the top surface of the body, the fabric material being a weft knitted structure having N×N ribs, wherein N is at least 2, and the top surface of the fabric material being at least partially exposed at surfaces of the plurality of teeth.

20 Claims, 3 Drawing Sheets

POWER TRANSMISSION BELT

BACKGROUND OF THE INVENTION (1) Field of the Invention

The present invention generally relates to a power transmission belt. In particular, the present invention is directed to a power transmission belt having a reinforcement layer including an exterior fabric material that is a weft knitted structure with at least 2×2 ribs.

(2) Description of the Related Art

Many known power transmission belts include a body of belt material and a plurality of integrally formed teeth formed in the body along at least one surface of the belt. Known belts may also include a tensile member such as a steel cord embedded in the body as a load carrying member and a fabric material as reinforcement at the outside edge of the belt surface where the belt teeth are formed. One example of such a belt is a power transmission belt that is formed as a V-belt, i.e., a variable speed belt having teeth in the form of cogs, which define belt grooves to enhance the belt's flexibility. Another example of such a belt is a synchronous or timing belt where the teeth are designed to engage a toothed pulley to effect power transmission. The fabric material at the outside edge of the belt surfaces helps reinforce the teeth in every type of belt and enhances the overall wear resistance of the belt.

In using fabric material as reinforcement, it is desirable that the material have both a high heat resistance while at the same time having a structure that properly adheres to the body of the belt. It is also desirable to select a fabric material that sufficiently covers the body of the belt to minimize the amount of body material that is transferred to the surface of the transmission pulleys. U.S. Pat. No. 5,645,504, which is hereby incorporated by reference as if disclosed herein in its entirety, teaches a fabric material that is a weft knitted structure in the form of a 1×1 rib. A portion of the weft knitted structure is embedded in the body of the belt while another portion serves as an exterior surface covering for the belt teeth. The fabric material in U.S. Pat. No. 5,645,504 provides a material with a higher heat resistance and a structure that adheres to the body of the belt. However, weft knitted structures having a 1×1 rib may not sufficiently minimize the amount of body material that is transferred to the surface of the transmission pulleys.

BRIEF SUMMARY OF THE INVENTION

One aspect of the present invention is a power transmission belt including the following: a backing layer; a body having a top surface and a bottom surface, the bottom surface joined with the backing layer, the top surface including a plurality of teeth, and the body including a plurality of reinforcing cords positioned between the top and bottom surfaces; and a fabric material having a top surface and a bottom surface, the bottom surface at least partially embedded in the top surface of the body, the fabric material being a weft knitted structure having N×N ribs, wherein N is at least 2, and the top surface of the fabric material being at least partially exposed at surfaces of the plurality of teeth.

Another aspect of the invention is a power transmission belt including the following: a backing layer; a body having a top surface and a bottom surface, the bottom surface joined with the backing layer, the top surface including a plurality of teeth, and the body including a plurality of reinforcing cords positioned between the top and bottom surfaces; and a fabric material having a top surface and a bottom surface, the bottom surface at least partially embedded in the top surface of the body, the fabric material being a weft knitted structure having 2×2 ribs, and the top surface of the fabric material being at least partially exposed at surfaces of the plurality of teeth.

Still another aspect of the invention is a power transmission belt including the following: a body having a top surface and a bottom surface; and a fabric material having a top surface and a bottom surface, the bottom surface of the fabric material at least partially embedded in the top surface of the body, the fabric material being a weft knitted structure having N×N ribs, wherein N is at least 2, and the top surface of the fabric material being at least partially exposed at the top surface of the body.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
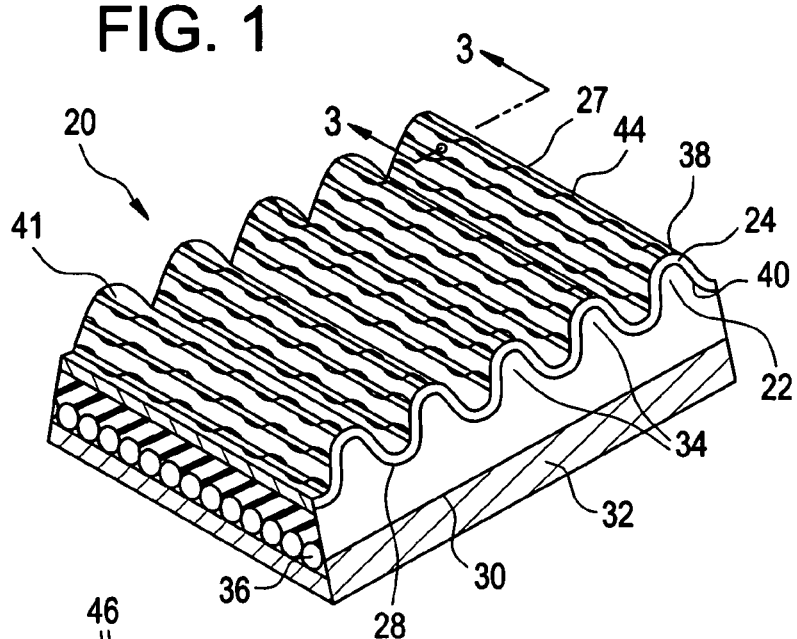
FIG. 1 is an isometric sectional view of a portion of a power transmission belt according to one embodiment of the present invention.
Figure 2:
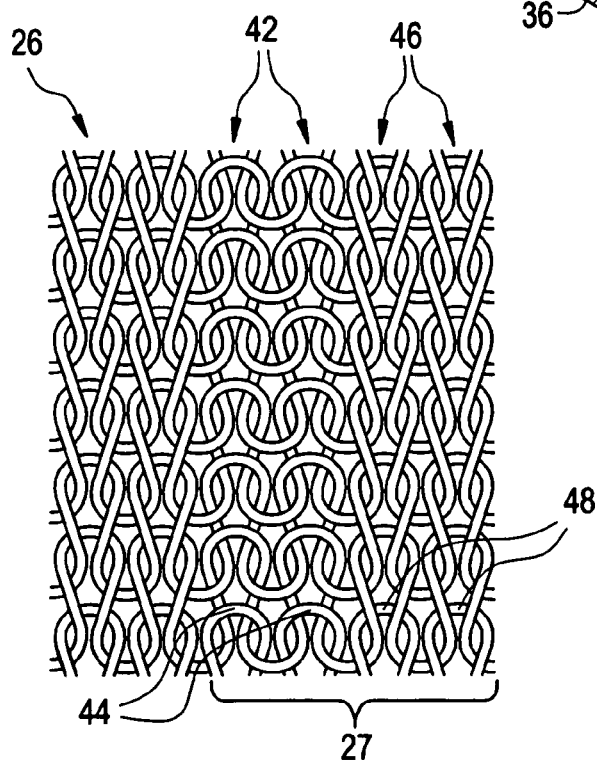
FIG. 2 is an enlarged portion of a fabric material according to one embodiment of the present invention.
Figure 3:
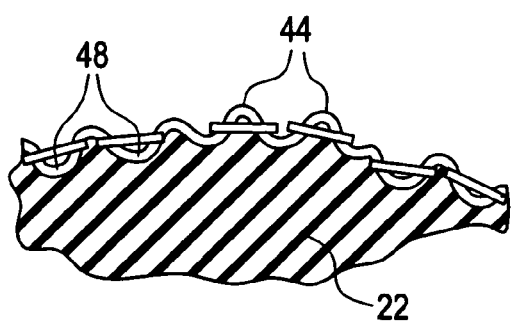
FIG. 3 is an enlarged partial cross-sectional view taken along line 3-3 of FIG. 1.

Referring now to the drawings in which like reference numerals indicate like parts, and in particular, to FIGS. 1-3, one aspect of the present invention is a power transmission belt 20 including a body 22 covered by a fabric material 24 with a weft knitted structure 26 having N×N ribs 27, where N is at least 2.

Body 22 generally includes a top surface 28 and a bottom surface 30. Bottom surface 30 is typically joined with a backing layer 32. Top surface 28 may include a plurality of teeth 34. Body 22 may include a plurality of reinforcing cords 36 positioned between top and bottom surfaces 28 and 30, respectively.

Fabric material 24 typically includes a top surface 38 and a bottom surface 40. Top surface 38 of fabric material 24 is generally at least partially exposed at surfaces 41 of plurality of teeth 34. Bottom surface 40 may be at least partially embedded in top surface 28 of body 22. As best illustrated in FIG. 2, fabric material 24 is typically formed from weft knitted structure 26, which includes N×N ribs 27. N is typically at least two, e.g., 2×2 ribs, 3×3 ribs, etc. As shown in FIG. 2, fabric material 24 having 2×2 ribs is one in which two adjacent wales 42 of face loops 44 alternate with two adjacent wales 46 of back loops 48 in a series, i.e., N×N ribs 27. Face loops 44 generally define top surface 38 and back loops 48 generally define bottom surface 40. N×N ribs 27 are typically oriented so as to be transverse with respect to belt 20 and are positioned so as to extend across plurality of teeth 34, but may be oriented other than transversely. Weft knitted structure 26 is typically stretched from 10-150% in either the direction of N×N ribs 27 or transverse to the ribs when joined with body 22. Weft knitted structure 26 may be knitted flat and sewn into a tube or knitted into a tube providing it is stretched to between about 10-150% when joined with body 22.

Fabric material 24 is generally coated with at least one of an adhesive and rubber compound. In one embodiment, bottom surface 40 is coated with a rubber compound. In another embodiment, fabric material 24 is coated with resorcinol formaldehyde latex (RFL) on both top and bottom surfaces 38 and 40, respectively. Fabric material 24 is typically selected so that it has a thermal stability of at least 500° F. Exemplary fibers used to form fabric material 24 include but are not limited to one of acrylic nylon, rayon cotton, polyester, aramid, and blends thereof.

Figure 4:
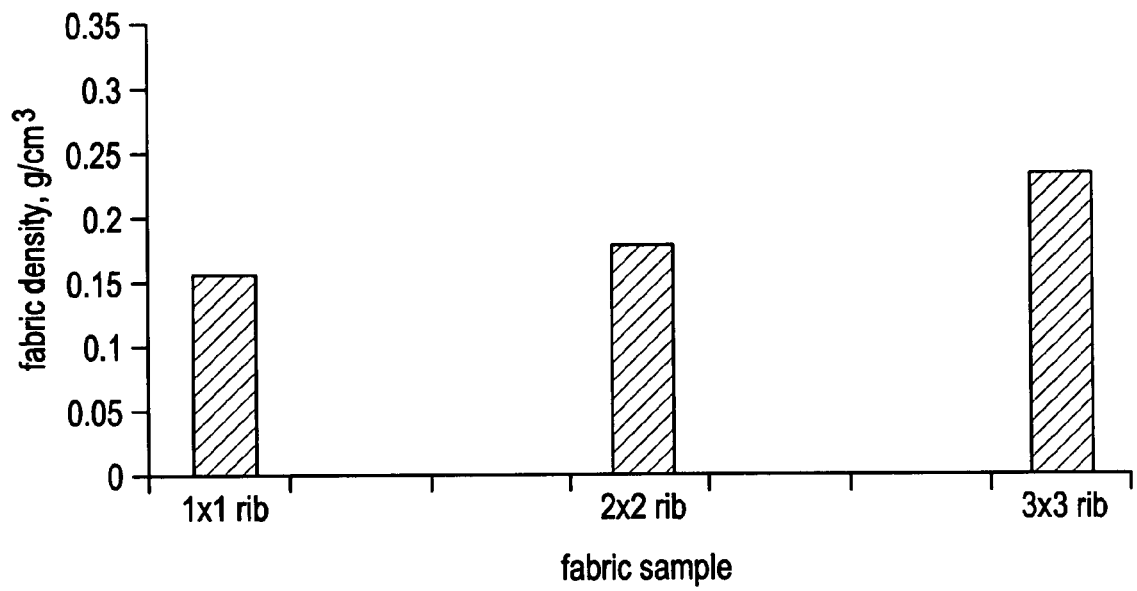
FIG. 4 is a chart showing the fabric density of various fabric materials.
Figure 5:
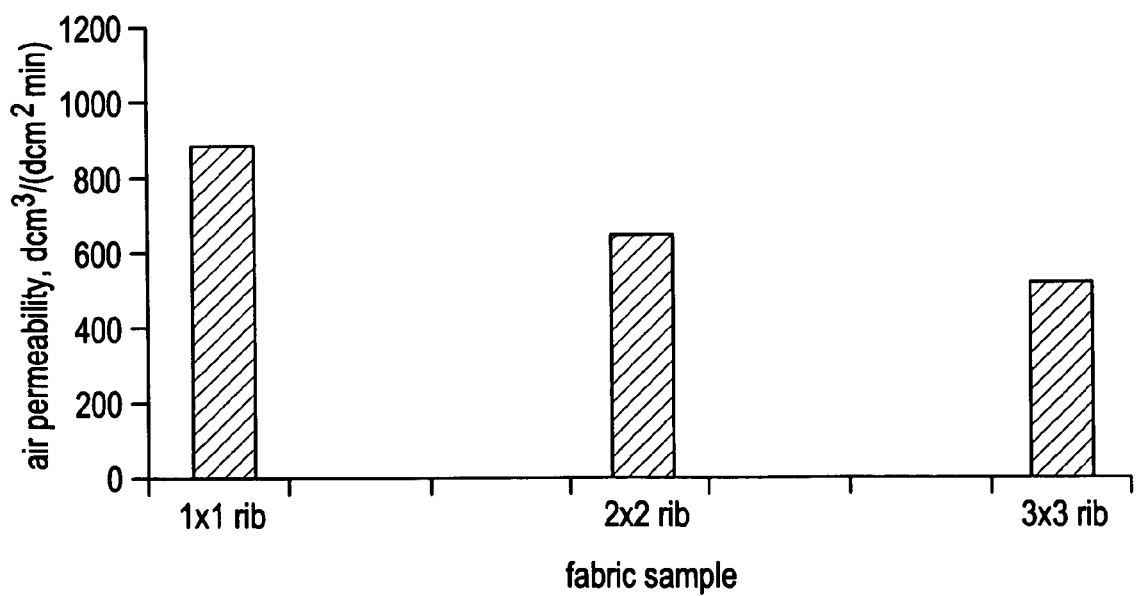
FIG. 5 is a chart showing the air permeability of various fabric materials.

Fabric materials including weft knitted structures such as weft knitted structure 26, which includes N×N ribs 27 where N is typically at least 2, e.g., 2×2 ribs, 3×3 ribs, etc., offer advantages over fabric materials having weft knitted structures with 1×1 ribs or non-ribbed knits. Referring now to FIGS. 4 and 5, the fabric density of a weft knitted structure increases with the number of ribs, i.e., a 2×2 rib has a higher fabric density than a 1×1 rib and a 3×3 rib has a higher fabric density than a 2×2 rib. Conversely, the air permeability of a weft knitted structure decreases with the number of ribs, i.e., a 2×2 rib has a lower fabric density than a 1×1 rib and a 3×3 rib has a lower fabric density than a 2×2 rib. The higher density and lower air permeability characteristics of the 2×2 and 3×3 rib structures are advantageous in that the transfer of rubber and residue from the body of the belt to the transmission pulleys is significantly reduced over that of a 1×1 rib structure. Because the voids between the fibers of the 2×2 and 3×3 rib structures are smaller than those of a 1×1 rib structure, less material from the body of the belt contacts the transmission pulleys and therefore less transfer of rubber and residue occurs.

Figure 6:
FIG. 6 is an enlarged top view of a portion of a fabric material according to one embodiment of the present invention.

Referring now to FIG. 6, a top view of a portion of fabric having 3×3 ribs is shown.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following claims.

What is claimed is:

1. A power transmission belt comprising:
   a backing layer;
   a body having a top surface and a bottom surface, said bottom surface joined with said backing layer, said top surface including a plurality of teeth, and said body including a plurality of reinforcing cords positioned between said top and bottom surfaces; and
   a fabric material having a top surface and a bottom surface, said bottom surface of said fabric material at least partially embedded in said top surface of said body, said fabric material being a weft knitted structure having N×N ribs, wherein N is at least 2, and said top surface of said fabric material being at least partially exposed at surfaces of said plurality of teeth.

2. A power transmission belt according to claim 1, wherein said fabric material is oriented so that said N×N ribs run transversely with respect to the belt and across said plurality of teeth.

3. A power transmission belt according to claim 1, wherein said fabric material is manufactured from fibers including one of acrylic nylon, rayon cotton, polyester, aramid, and blends thereof.

4. A power transmission belt according to claim 1, wherein said fabric material has a thermal stability of at least 500° F.

5. A power transmission belt according to claim 1, wherein said weft knitted structure is stretched from 10-150%.

6. A power transmission belt according to claim 1, wherein said weft knitted structure is knitted flat and sewn into a tube.

7. A power transmission belt according to claim 1, wherein said weft knitted structure is knitted into a tube.

8. A power transmission belt according to claim 1, wherein said fabric material is coated with at least one of an adhesive and rubber compound.

9. A power transmission belt according to claim 8, wherein said fabric material is coated with RFL on both said top and bottom surfaces and said bottom surface is coated with a rubber compound.

10. A power transmission belt according to claim 1, wherein said weft knitted structure has 2×2 ribs.

11. A power transmission belt according to claim 1, wherein said weft knitted structure has 3×3 ribs.

12. A power transmission belt comprising:
    a backing layer;
    a body having a top surface and a bottom surface, said bottom surface joined with said backing layer, said top surface including a plurality of teeth, and said body including a plurality of reinforcing cords positioned between said top and bottom surfaces; and
    a fabric material having a top surface and a bottom surface, said bottom surface of said fabric material at least partially embedded in said top surface of said body, said fabric material being a weft knitted structure having 2×2 ribs, and said top surface of said fabric material being at least partially exposed at surfaces of said plurality of teeth.

13. A power transmission belt according to claim 12, wherein said fabric material is oriented so that said 2×2 ribs run transversely with respect to the belt and across said plurality of teeth.

14. A power transmission belt according to claim 12, wherein said fabric material is manufactured from fibers including one of acrylic nylon, rayon cotton, polyester, aramid, and blends thereof.

15. A power transmission belt according to claim 12, wherein said fabric material has a thermal stability of at least 500° F.

16. A power transmission belt according to claim 12, wherein said weft knitted structure is stretched from 10-150%.

17. A power transmission belt comprising:
    a body having a top surface and a bottom surface; and
    a fabric material having a top surface and a bottom surface, said bottom surface of said fabric material at least partially embedded in said top surface of said body, said fabric material being a weft knitted structure having N×N ribs, wherein N is at least 2, and said top surface of said fabric material being at least partially exposed at said top surface of said body.

18. A power transmission belt according to claim 17, further comprising a backing layer that is joined with said body.

19. A power transmission belt according to claim 17, wherein said body includes a plurality of reinforcing cords positioned between said top and bottom surfaces.

20. A power transmission belt according to claim 17, wherein said top surface includes a plurality of teeth.

* * * * *

UNITED STATES PATENT AND TRADEMARK OFFICE
CERTIFICATE OF CORRECTION

PATENT NO. : 7,749,120 B2  Page 1 of 1
APPLICATION NO. : 11/592972
DATED : July 6, 2010
INVENTOR(S) : Daniel A. Pelton It is certified that error appears in the above-identified patent and that said Letters Patent is hereby corrected as shown below:

Claim 3, Col. 3, Line 65, "rayon" should be --rayon,--

Claim 14, Col. 4, Line 41, "rayon" should be --rayon,--

Signed and Sealed this

Twenty-eighth Day of September, 2010

David J. Kappos
*Director of the United States Patent and Trademark Office*